July 6, 1971 R. A. ZEINEH 3,591,493
METHOD FOR THE TREATMENT OF BIOLOGICAL FLUIDS
AND APPARATUS THEREFOR
Filed June 17, 1968 2 Sheets-Sheet 1
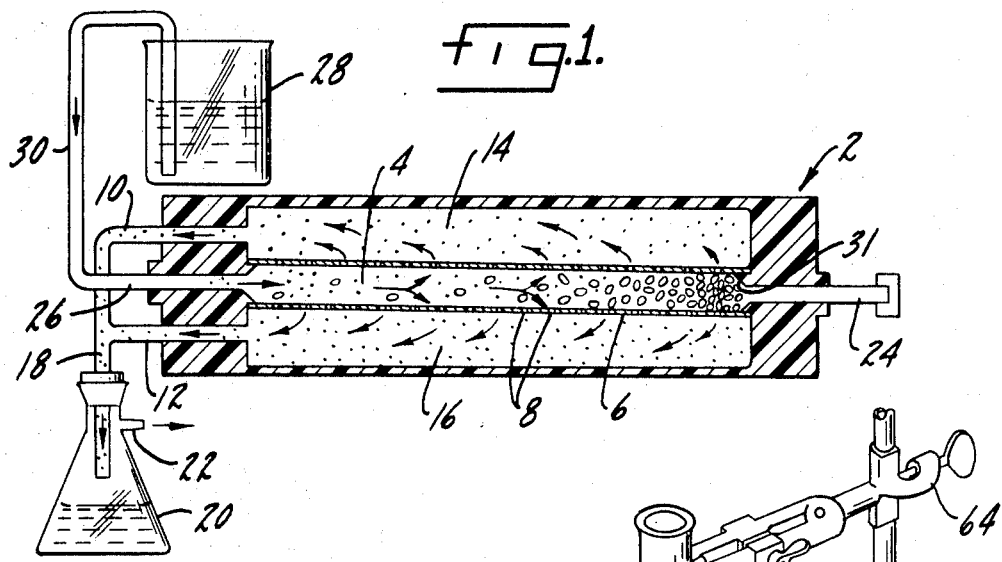
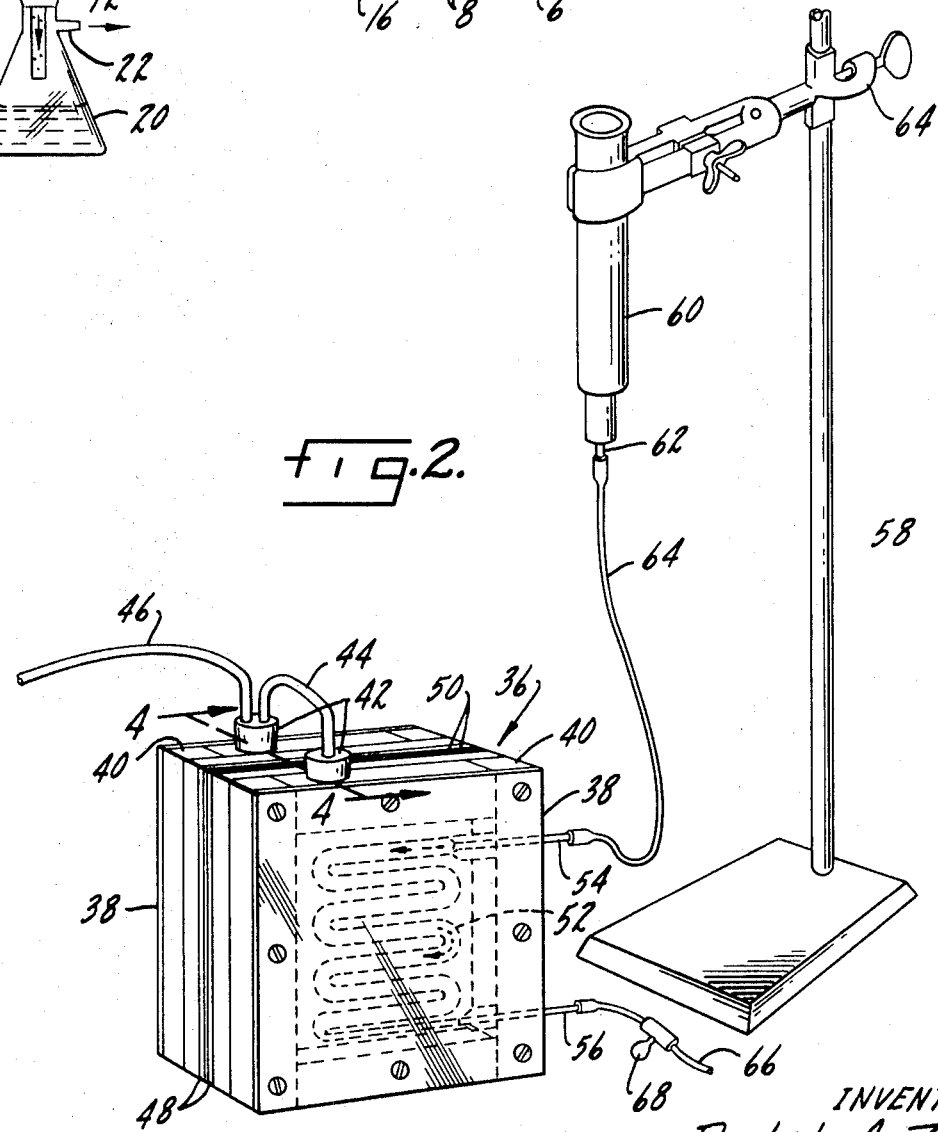
INVENTOR.
Rashid A. Zeineh
BY Mann, Brown & McWilliams
Attorneys.

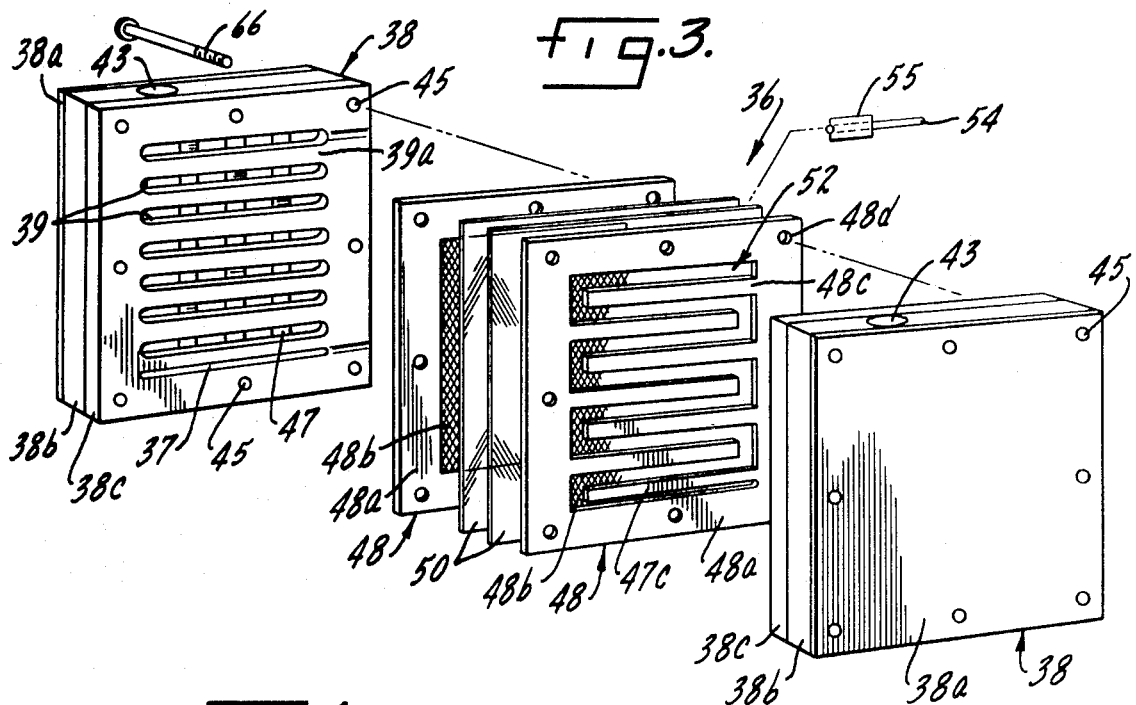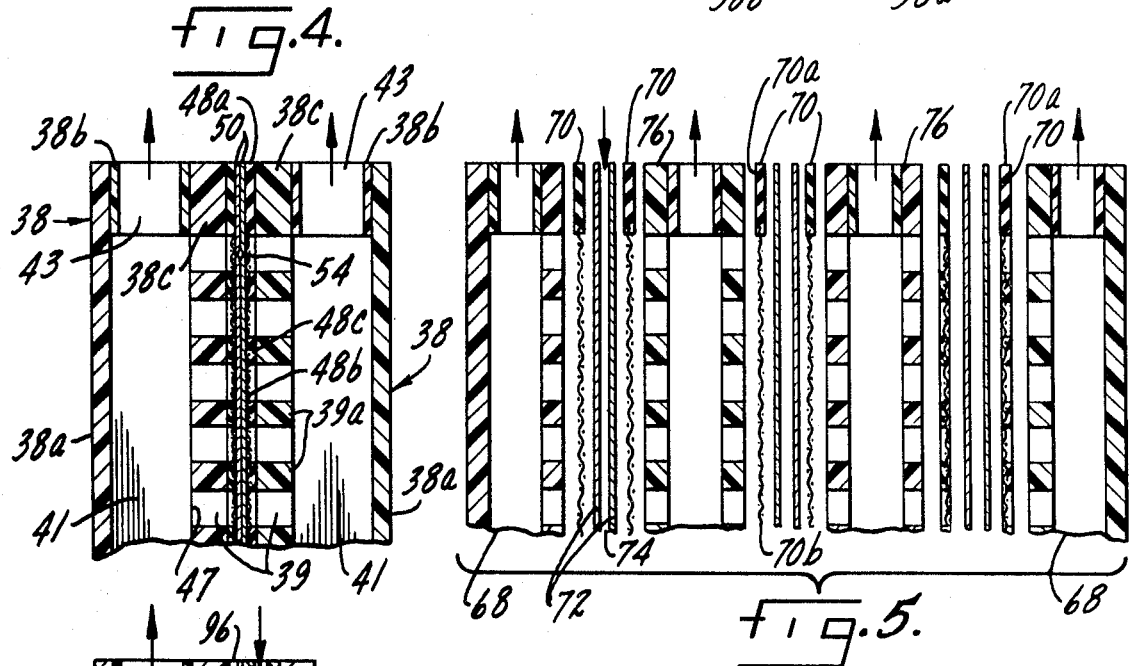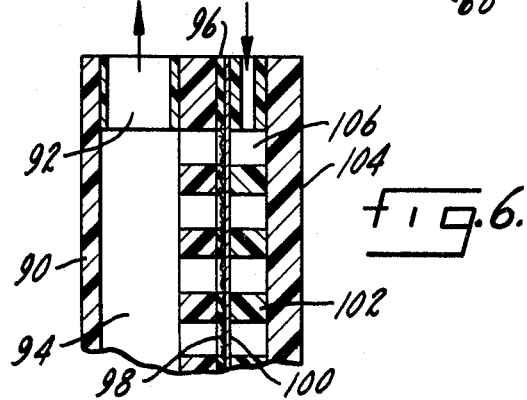

United States Patent Office 3,591,493
Patented July 6, 1971

3,591,493
METHOD FOR THE TREATMENT OF BIOLOGICAL FLUIDS AND APPARATUS THEREFOR
Rashid A. Zeineh, 5742 W. Dakin St.,
Chicago, Ill. 60634
Filed June 17, 1968, Ser. No. 737,751
Int. Cl. B01d 13/00
U.S. Cl. 210—22                                    17 Claims

ABSTRACT OF THE DISCLOSURE

A method and apparatus for the treatment of biological fluids including primarily the separation and microconcentration of macromolecular structure substances from fluids in which they occur by the utilization of a semipermeable membrane which only permits the flow of smaller molecular structure substances therethrough while retaining the larger molecules for eventual recovery. Preferably, a biological fluid such as urine is introduced into a serpentine-type fluid pathway formed by a porous membrane such as cellophane and because of a pressure differential on either side of the pathway, the components of the biological fluid of smaller molecular structure pass through the membranes to a collector. The remaining material such as protein of macromolecular structure is carried through the serpentine path to its terminus where it may be readily recovered.

CROSS-REFERENCES TO RELATED APPLICATIONS

This application is in one sense an improvement upon the apparatus and method disclosed in applicant's copending patent application Ser. No. 466,981 filed June 25, 1965 and entitled "Method and Apparatus for Buffering, Dialysis and Concentrating Biological Fluid Specimens" and the disclosures contained therein are hereby incorporated by reference.

BACKGROUND OF THE INVENTION

The present invention relates to biological, biochemical and medical research and more specifically will find its greatest use in clinical diagnostic procedures. More specifically, the present invention pertains to an improved method and apparatus for concentrating the protein in cerebrospinal fluid and urine specimens for diagnostic tests and the like.

Generally speaking, the method and apparatus of this invention involves the process of separation and microconcentration. Microconcentration, as used in the specification and claims, is to be taken to be that process of concentrating various volumes of fluids to very small volumes, e.g., drops. The separation and concentration of a specific substance from a mixture of components, including that substance, generally constitutes an essential step in many preparative, diagnostic and research procedures. Such procedures include work with biological factors such as proteins and other macromolecular structure substances. A major category of these factors are proteins, enzymes, viruses, antigens, antibodies, allergens, hormones and others. For example, enzymes comprise one particular kind of protein which is a prominent area of investigation in present day research.

The procedures involved in the study of enzymes include, for example, purification, homogenate study, fractionation based on solubility, extraction, gel filtration, electrophoresis and column chromatography.

The present invention, therefore, will additionally have specific application and importance in the fields of column chromatography, gel filtration and in continuous flow electrophoresis fractionation. At the present time, as far as is known, there is no method or apparatus which will satisfactorily provide for the concentration of urine and cerebrospinal fluid prior to the electrophoresis of the protein content which is a diagnostic aid in the detection of multiple myeloma and multiple sclerosis in these fluids, respectively.

The prior art methods of separating and microconcentrating various biological fluids suffer in many respects. For instance, it is presently the practice to concentrate and obtain the low protein content of some biological fluids, such as cerebrospinal fluid or urine, by bag dialysis utilizing dextran or polyvinyl pyrrolidone. This type of process normally involves a period of time between two and seven days during which period bacterial growth and protein denaturation can occur (see Gragan, C. H. and Roboz, E., Simple Apparatus for Concentrating Biological Fuids of Low Protein Content, J. P. Lab and Clin. Med. 45:495, 1955 and Esser, H. Heinzler, F., and Wild, H. A., Simple Method for a Protein Concentration of Cerebrospinal Fluid in Preparation for Paper Electrophoresis, KLIN. Wchnchr. 30:228, 1952).

Lyophilization or freeze drying is still another prior art method of concentration which suffers from many drawbacks. Lyophilization should be preceded by dialysis or otherwise the non-volatile salts are also concentrated which may have a deleterious effect on the protein content of the biological specimens (see Eaton, C. J. and Gardner, M. D., Separation of Cerebrospinal Fluid Proteins by Paper Electrophoresis, Biochem. J. 55:25, 1953 and Schneider, G. and Wallenius, G., Electrophoretic Studies on Cerebrospinal Fluid Proteins, Scand, J. Clin. and Lab. Invest. 3:140, 1951).

Both dialysis and lyophilization are tedious and time consuming, generally necessitating a period of days in which to complete the process. Activity loss will take place due to inactivation by the mere passage of time alone and due to loss of material during the transfer processes.

Recent improvements have evolved in concentration techniques which drastically shorten the time needed for concentration but for the most part the major drawbacks of these prior art systems are still present. For a rapid concentration technique of cerebrospinal fluid taking only a matter of four hours or more with low protein recovery see Beckman R. Technical Bulletin RB–TB–994, Palo Alto, Calif., 1963; Goldstein, N. P., Hill, N.C., McKinzie, B. F., McGulkin, W. F. and Svien, H. J., Med. Clin. N. Am., 44:1053, 1960; Kabat, E. A., Moore, D. H. and Landow, H., J. Clin. Invest., 21:571, 1942; Whitaker, J. N. and Lemmi, H., Tech. Bull, Reg. Med. Tech., 36:91, 1966; Burrows, S., Clin. Chem. 11:1068–1069, 1965; Cosgrove, J. B. R. and Agius, P., Neurol. 15:1155–1160, 1965; Igou, P. C., Am. J. Med. Tech., 33, 354–360, 1967; Kaplan A. and Johnstone, M., Clin. Chem., 12:717–727, 1966; Patrick, R. L. and Thiers, R. E., Clin. Chem., 9:283– 295, 1963; Lemmon, L. J., Newman, N. A. and DeJung, R. N., Univ. of Mich. M. Bull. 23:3, 1957.

3,591,493

The prior art method of concentrating urine prior to paper electrophoresis may yield a high degree of concentrations suitable for protein electrophoresis but the methods and techniques are rather slow, cumbersome and not satisfactory since results show that alteration in some of the native protein may take place. While these drawbacks are not as serious as those connected with cerebrospinal fluid because the volume of urine is not as limited as in the case of cerebrospinal fluid, serious drawbacks nevertheless exist. See Miyasato, F. and Pollak, V. E., J. Lab. and Clin. Med. 67:1036, 1966; Blatt, W. F. Feinberg, M. P., Hopfenberg, H. B. and Saravis, C. A., Science, 150:224, 1965; McGarry, E., Sehon, A. H. and Rose, B., J. Clin. Invest., 34:832, 1955 and Miyasato, F. and Pollak, V. E., J. Lab. and Clin. Med., 67:1936, 1966.

SUMMARY OF THE INVENTION

Generally speaking, the present invention pertains to a method and apparatus for separating and microconcentrating substances of macromolecular structure from a mixture comprising said substances in a carrier substance of different and usually smaller molecular structure. By fisrt passing the mixture along a fluid pathway formed by a porous membrane characterized as permitting fluid passage therethrough, but substantially inhibiting the passage of said substance of macromolecular structure, and by maintaining a pressure differential adjacent the fluid pathway to facilitate withdrawal of the carrier substance from the fluid pathway, it is possible to recover substances of macromolecular structure in substantially concentrated form.

It is therefore an object of this invention to obtain the concentration of cerebrospinal fluid in a short period of time in a higher degree of concentration than has heretofore been available.

It is another object of this invention to provide a separating and microconcentrating apparatus which is simple in form and easy to service.

It is still another object of this invention to provide a method and apparatus by which substances of macromolecular structure may be separated from mixtures containing them.

It is still another object of this invention to obtain macromolecular structure materials such as protein from solutions in substantially concentrated form.

It is still another object of this invention to provide a method and apparatus for obtaining from dilute protein solution substantially concentrated protein in salt-free form.

It is yet another object of this invention to recover macromolecular structure substances, such as protein, from biological fluids such as urine and cerebrospinal fluid in a relatively short period of time utilizing simple, straight-forward methods and apparatus.

These and still further objects will become manifest from the hereinafter following commentary taken in conjunction with the various drawings.

BRIEF DESCRIPTION OF THE DRAWINGS

FIG. 1 is a schematic diagrammatic illustration of the basic principles involved in the method and apparatus of this invention;

FIG. 2 is a perspective of the assemblage of components for the practice of the herein disclosed invention;

FIG. 3 is an exploded view of a portion of the apparatus depicted in FIG. 2;

FIG. 4 is an enlarged section taken along the line 4—4 of FIG. 2;

FIG. 5 shows an alternative embodiment of the invention illustrating several cells in stacked relation; and FIG. 6 shows an alternative embodiment of the invention utilizing a single membrane.

DESCRIPTION OF THE PREFERRED EMBODIMENTS

Referring to the drawings wherein like numerals of reference indicate like elements throughout the several views and specifically referring to FIG. 1, the overall apparatus and method of operation may be seen in basic form.

The cell structure 2 is shown as a housing in which is supported a tubular or other configured fluid pathway 4 formed by semi-permeable or porous membrane 6 having pore openings 8 of such size as to only permit the passage of specific selected components therethrough. Cell 2 has connections 10 and 12 communicating to chambers 14 and 16 on either side of membrane 6. Connections 10 and 12 merge into a common conduit 18 terminating in flask or receptacle 20 having means 22 for connection to a vacuum source, not shown. Fluid pathway 4 terminates in outlet 24 by which the concentrated material may be removed from fluid pathway 4. An inlet 26 communicating with the fluid pathway connects to a dilute biological fluid specimen supply contained in beaker or flask 28 by means of conduit 30. The dilute biological fluid contains, for example, macromolecular material such as protein and other components of smaller molecular structure. Because flask 28 is at a higher level than cell 2, the dilute protein solution contained within beaker 28 will flow through conduit 30 through fluid pathway inlet 26 and thence along the fluid pathway. During the flow of the dilute protein solution into cell 2 the suction source is activated to thereby create a pressure differential in the chambers 14 and 16 on either side of fluid pathway 4. Because of the vacuum and because the porous membrane allows for the passage of only relatively smaller molecular substances as opposed to the larger protein molecules, the fluid comprising the small molecular structure substances passes through the pores 8 into the chambers 14 and 16 and thence by connections 10 and 12 to collecting flask 20. Left behind within fluid pathway 4 are the macromolecular substances such as protein which are collected at the terminal end 31 of the fluid pathway. As can be seen, the fluid pathway 4 has a slight slope so as to facilitate the collection of the protein material at the terminal or outlet end of the fluid pathway 24. The effects of gravitation, of course, provide for the migration of the protein material to the outlet end. The pressure differential or vacuum maintained in chambers 14 and 16 also aids the flow of the dilute protein solution from the beaker 28 and also provides an assurance that the fluid pathway 4 is maintained in the expanded position as shown. Without the presence of fluid or the vacuum in chambers 14 and 16 the fluid pathway would be in the collapsed position.

Referring now to FIG. 2 the overall assemblage of working components of the separator and microconcentrator is indicated. The specific details of the separator and microconcentrator 36 will be thoroughly described with reference to the remaining figures. For present purposes it is seen that cell 36 comprises two end plate sections 38 having hollow grooves or cavities formed on the inside faces thereof, not shown. The plates 38 have on their upper surfaces 40 a passageway or aperture communicating to the interior of the vacuum chambers referred to immediately above. In passageways 40 are stoppers 42 such as the rubber ones normally found in labs, having a communicating conduit 44 and conduit 46 which leads to a vacuum source not shown. Disposed between plates 38, shown here as being made of a transparent plastic material, are two grid-like plate structures 48 each interior surface or face supporting a semi-porous membrane such as a cellophane sheet 50.

The grid support plates 48 have extending portions which for present purposes suffice to say form a serpentine path such as 52 between the cellophane sheets 50. An inlet into the serpentine path 52 is formed by means of a thin needle or conduit-like connection such as 54 disposed between the porous membranes in fluid tight relation. It will be noted that the inlet to the serpentine path is of larger volume than the outlet at 56, the outlet having a similar connection as the inlet, i.e., a thin member disposed between the porous or semi-permeable membranes.

A stand such as 58 supports container 60 suitable for containing biological specimen fluid such as cerebrospinal fluid or the like and having an outlet 62. A hose connection 64 between the outlet 62 and the inlet 54 provides means of introducing the biological specimen into the cell 36 and more specifically into the serpentine fluid pathway 52. It will be noted that it is possible by the leveling components 64 of the support stand 58 to maintain the specimen at any desired height so as to obtain gravity flow into the cell 36. An outlet conduit 66 having thumb valve 68 connected to outlet conduit 56 of the cell 36 completes the basic components of the overall apparatus for separating and microconcentrating specific macromolecular structure substances such as protein.

The mode of operation for the apparatus depicted in FIG. 2 is in principle identical for that described for FIG. 1 with the single major difference being that the biological specimen is made to flow along a serpentine path. Generally speaking, in laboratory use, the cell 36 will be filled with a fluid such as water in order to maintain the membranes in the most desirable state and also for purposes of sterility. To empty the apparatus of this water one simply connects the outlet tube 66 to an air supply source, opens the valve 68 and drives the water back through the serpentine path 52, through the inlet 54, through the hose connection 64 and thence into the flask 60 where it is accumulated and then discarded. So as to insure that there are no air bubbles within the cell 36 it is preferable to take a portion of the biological fluid which is to be separated and concentrated and inject it through the outlet hose 66 to likewise be driven through the unit to drive out any air bubbles, etc. that might have been trapped within the cell.

Once the cell and other components of the apparatus have been readied for use, a biological fluid specimen is simply placed within flask 60 and the leveling mechanism 64 positioned so that the flask or reservoir 60 is about two to five inches above the cell 36. Preferably the cell 36 is placed flat on a supporting base such as a laboratory bench or in order to insure gravitational flow to the outlet 56 slightly tilted thereto. Each of these measures will insure proper gravitational flow through the serpentine path. It goes without saying, however, that where desired one cold apply a slight vacuum to the line 66 in order to obtain continued, positive flow.

Once the biological fluid sample has been introduced into the flask 60 a vacuum is applied via hose 46 which is connected to a vacuum source not shown. A vacuum in the area of about —10 to —25 p.s.i.g. should be continued over the entire period of separating and microconcentration. Preferably, negative pressures in the upper ranges are desirable for faster flow-through of materials. This elapsed time will normally be about four minutes for each millimeter of sample or an overall time period of 15 to 20 minutes after the last portion of the sample leaves the reservoir or flask 60. As the fluid flows through the hose 64 into the inlet 54 and is introduced into the initial portion of the serpentine path 52, the fluid components of smaller molecular structure will be passed through the semi-permeable or porous membrane of the fluid path and will eventually be drawn out through hose connections 44 and 46 to a collector not shown. During travel through the serpentine path, the macromolecular structure substances, such as protein, become more and more concentrated until ultimately at the outlet 56 they may be collected by merely opening valve 68 and allowing the sample to flow through the connection 66 to whatever collecting means might be desired, e.g., capillary tubes. From thereon, of course, the capillary tubes with the sample of the concentrated protein therein may be frozen until time arises for their use or otherwise subjected to diagnostic studies.

The apparatus just described may be utilized in column chromatography. For instance, should it be desired to conduct a step-wise column chromatography procedure, one merely fills the serpentine concentration path and part of the reservoir or biological fluid supply flask with distilled water while allowing vacuum in the system to build up gradually. The effluent from the column then flows in drop-wise fashion into the flask reservoir. For a microconcentrator of the type illustrated in FIG. 2, the rate of concentration is about 12–18 ml./hr. for —15 and —25 p.s.i.g. respectively and, of course, will vary depending upon the magnitude of the vacuum. If the effluent from the column is less than the rate of concentration, the cell will adjust itself to that rate by trapping air bubbles within. Otherwise the excess of column effluent will accumulate in the reservoir which will be later concentrated by continuation of the separation and microconcentration after the column chromatography procedure has been terminated. Over-concentration at the outlet side of the serpentine concentration path may be avoided by partial bleeding. Obviously, reversing the inlet and outlet of the cell will lower the degree of over-concentration.

Likewise, should it be desired to conduct a gradient column chromatography procedure, the fractions collected may be concentrated to any desired degree without mixing problems between the successive fractions obtained. The range of concentration should be less than 10–16 ml./hr. for the type of apparatus depicted in FIG. 2. When using the FIG. 2 apparatus and a 12 ml./hr. and a three-fold concentration is desired, one merely regulates the outflow from the unit outlet to 5 ml./hr. by adjusting inflow by means of a valve or the like. The separation and microconcentration rate of the unit is reduced from 12 to 10 ml./hr. by trapping air bubbles as a means of self-adjustment. These air bubbles also prevent mixing in the serpentine concentration path which in turn prevents interference with column resolution. The flow rates referred to above generally contemplate a cell as illustrated in FIG. 2 having the following physical dimensions: A concentration path having a length of 64 cm., a width of 0.6 cm., and a depth of about 0.05 cm.; with a pair of membranes of 15 A. pore size and overall unit dimensions of 11 x 11 x 2.5 cm.

Obviously, in addition to column chromatography uses, it is also possible to dialyze a protein substance that has been collected in the serpentine path by merely passing a solvent for the salts along the serpentine path. Normally this procedure will entail utilization of distilled water. The distilled water will flush through the system dissolving and carrying out the salts that have been collected with the macromolecular structure protein and eventually it will be possible, if desired, to obtain substantially concentrated, macromolecular substances in salt-free form.

In order to obtain equilibration one merely adds a buffer solution instead of the water as in the dialysis procedure. Should it be desired to carry out an electrodialysis operation it is only necessary to fill the vacuum chambers on either side of the grid-like plate or membrane support structures with distilled water with the immersion of two platinum electrodes into the chamber across which an electrical potential of about 10–30 volts is applied for a few minutes. The copending application referred to earlier provides satisfactory disclosure as to how the devices of the instant invention can be modified for such uses.

Referring to FIGS. 3 and 4, more details of construction of the cell 36 may be observed. End plates 38 are illustrated as being formed of three plate-like sections. The first involves a substantially flat non-porous plate 38a, the second plate member 38b having a substantially cut-out center section thereby forming a rectangular band-like member and an end interior plate 38c having spaced slots 39 with plate portions 39a between the slots which are intended to abut in side by side relationship rib-like members of support grids hereinafter described. Where the materials of construction are such as to be deformable under pressure, it is desirable to provide back-up or support members 47 to keep plate portions 39a from flexing. Here the members 47 are shown as being spaced and rectangular and being the entire width of the chamber 41. Obviously, other configurations of plate components and supports may be utilized. It will be noted that all of the slots 39, with the exception of the lowermost one 37, are of approximately equal size. The reason for slot 37 being smaller will become apparent. It is, of course, obvious that the three sections when placed and secured together form unitary plate structure 38 having an interior cavity or chamber 41 through which fluids are collected and withdrawn therefrom. For fluid withdrawal, apertures 43 located in each of the upper surfaces of the end plates 38 are provided and communicate to each of the chambers 41 of each end plate 38.

While the plate structures 38 have been shown as being fabricated of the individual components 38a, 38b, and 38c, this is not critical to the operation of the device or to the practice of the invention. In some instances it may be desired to machine or otherwise fabricate the plate sections as a unitary member rather than as a fabricated one. Spaced through holes 45 provide means for ultimate assembly of the components of the cell 36 as by means of through bolt 66 for maintaining all of the plate-like structures in substantially rigid relationship.

The grid-like, membrane support structures 48 comprise a deformable edge portion 48a with extending portions of a material such as rubber, plastic or the like, which is suitable for fluid-tight engagement with the interior abutting face of plate 38. Disposed in the center of support 48 is screen or grid-like interior member 48b. The edge portion 48a has extending rib-like spaced portions such as 48c each of which are approximately equally spaced from one another with the exception of the lowermost one 47c which is so spaced so as to form with the uppermost, inside edge of 48a, a smaller area than that formed by the uppermost extending portion 48c with the lowermost, inside edge of the opposite parallel edge of 48a. The size and spacing of the extending portions 48c are intended to coincide and be congruent with plate portions 39a between slots 39 of plate section 38c. In order to obtain this proper relationship, upraised ridges may be provided in each extending portion to be received by a comparable groove in the material portions 39a of the plate between slots, not shown. Each of the two membrane supports or grids 48 are of identical construction and they are assembled in mirror-image fashion. That is, the side of the grids 48 having the screen therein or thereon face each other and the extending portions 48c mate together to form the serpentine fluid pathway when assembled with two sheets of semi-permeable or porous membranes 50. The serpentine path allows for communication throughout the chamber 41 even where intermediate, spaced supports 47 are provided.

It is preferred when assembling the apparatus that the plate portions 39a between slots 39 of the end plates 38 be of the same or slightly larger size as the extending rib-like portions 48c so as to provide for a tight abutting fit to prevent, for instance, substantial lateral movement of the support grids 48 with respect to the membranes 50. Grid supports 48 have apertures 48d therethrough so as to be capable of receiving retaining means such as bolt 66.

The inlet 54 is shown as having a rectangular thin portion 55 of a deformable material such as plastic for ease of insertion between the cellophane membranes 50 and likewise the outlet 56 may have an identical construction. In each instance, the rectangular portion 55 is of a material which is slightly compressible so as to be able to provide fluid-tight engagement between the cellophane membranes. After the components are assembled, an adhesive or other fluid sealant may be placed on the peripheral outside edges of the cell 36 so as to insure fluid retention solely within the serpentine path 52 formed by the pair of cellophane sheets 50 and grid support structures 48.

It is obvious, of course, that once a vacuum is created in the chambers 41, the cellophane sheets deform somewhat until they are up against the screen 48b and it is through the fluid pathway 52 thereby formed by the extending portions 48c that the fluids of small molecular structure are passed, the larger molecules, being unable to pass through the membrane, being swept towards the end of terminus of the serpentine path for ultimate collection. As earlier noted, the extending portion 47c is in close proximity to the bottom edge of the peripheral portion 48a so as to form a smaller pathway near the collecting point and this is merely to create a small volume in which the separated macromolecular substance such as protein may be easily retrieved.

While a serpentine fluid pathway has been illustrated and dwelt upon in some detail it is, of course, possible and in some instances desirable, to dispense with this type of pathway relying solely upon a great surface area of membrane as compared to volume flow to accomplish separation and microconcentration. Additionally, other geometrical patterns such as arcuate, circular, zig-zag or others may be used for the fluid pathway so long as the desired exposure is obtained and the sweeping effect of introduced fluid produces an accummulation of sought material at some point of the fluid pathway, preferably its terminus.

Support grid structures without the extending portions may be used and such an embodiment is illustrated in FIG. 5. In this instance, a series of cells in tandem employs two cells having a straight or open fluid path whereas the last cell of the tandem employs the serpentine path in order to more readily concentrate the macromolecular substance.

In this embodiment, end plates 68 are provided similar to the end plates 38 shown in FIGS. 3 and 4. They provide means whereby vacuum chambers are disposed on that side of the grid structure facing inwardly to the vacuum chambers. Between the other grids a spacer or other means is employed in order to also provide a vacuum chamber on that side of the grid. More specifically, in juxtaposition to the end plates 68 are grid structures 70 having a rubber peripheral edge 70a which supports a screen 70b. Between the grid supports 70 are disposed semi-permeable membranes 72 forming between them a straight fluid pathway or merely a volume 74 into which a fluid may be introduced and from which other fluids are extracted. Between the first cell and the second cell (looking from left to right in FIG. 5) a spacer means 76 is provided in order to provide a vacuum chamber for the successive grid support structures and, of course, these also must be connected to a vacuum source through means not shown. The last cell in the series (from left to right of FIG. 5) is identical to that depicted heretofore in FIGS. 2, 3 and 4 with the exception that in lieu of a closed end plate 38, spacer 76 is employed, again to provide means whereby a pressure differential on either side or along the fluid pathway formed by the semi-permeable membrane or cellophase sheets or the like material is obtained. It goes without saying that the inlet of the first cell (the extreme left one in FIG. 5) is connected to a biological fluid specimen supply as indicated by the inflowing arrow and the outlet, not shown, is connected to an inlet of the second cell (looking from the left) which provides a straight or non-serpentine fluid pathway and this cell or fluid pathway in turn is connected to the inlet of the serpentine path formed by the third and last cell so as to be able to pass and flow the specimen through each of the cells in successive fashion. Any number of cells may be used in tandem fashion depending upon the need and the demand therefor. It is obvious that the greater surface area of exposed membrane the faster the separating and microconcentrating process becomes.

Separating and microconcentration processes using a cell employing only one membrane are also possible with the herein disclosed invention. While not as efficient and not preferred it is nonetheless possible to employ such a structure in order to obtain a given end. Referring to FIG. 6, such a structure is depicted where an end plate member 90 having an aperture 92 for connection to the vacuum source is provided with a vacuum chamber 94. Disposed adjacent the vacuum chamber is a grid member 96 having grid screen 98 and membrane 100 abutting thereto. In this embodiment grid member 96 may or may not employ the serpentine path principle although where one membrane is utilized it is preferred to use such a serpentine path. Spacer element 102 is positioned between the cellophane sheet 100 and the end solid plate 104. Spacer 102 between the cellophase 100 and the end plate 104 provides a fluid path 106 along which the biological fluid specimen may flow. While the serpentine path has been described as being formed by the grid member 96, in lieu thereof it may be formed as a grooved channel in end member 104 similar to the structures disclosed in the hereinbefore designated copending application. Placement and utilization of the other components of the cell are manifest.

As indicated earlier, it is possible with the hereindisclosed apparatus to maintain the desired pressure differential by introducing the fluid specimen under an elevated pressure of about 10-25 p.s.i.g. thereby dispensing with the maintenance of a vacuum or negative pressure in the collecting chambers 41. Under such circumstances the pressure in the chambers 41 will be substantially atmospheric. When introducing the specimen fluid under elevated pressure care should be taken not to use excessively high pressures which could cause leakage from the cell itself, leakage through the membrane and/or rupture of the fluid pathway.

These and other embodiments as well as other uses of the herein disclosed apparatus and method will make themselves known to those of ordinary skill in the art and will fall within the purview of the spirit and scope of the invention as defined by the claims. For instance, instead of using through bolts and nuts in order to retain the various cell components in a unitary fashion, it is possible to use adhesive, etc., but because it will be necessary from time to time to replace the porous membrane, a cell structure which is easily assembled and disassembled is preferred.

The cell structure as illustrated particularly in FIGS. 2, 3 and 4 will generally be about 10-12 cm. square with vacuum chambers formed in the end plate being approximately 2½-4 cm. deep, the peripheral gasket material of the grid support being from 0.16-0.5 cm. thick with the total square area of the screen surface being within the area from 100-144 square cm., with the extending portions of the support grids being about .63 cm. thick and from about 0.16-0.5 cm. deep or high and being approximately 6.25-8.13 cm. long. Generally, the total volume of a serpentine fluid pathway, for example, will be about 1.4-1.8 ml. while its overall length may be from about 32-64 cm. A cell as depicted in FIG. 2 ideally has a concentration path or fluid pathway with a 1.8 ml. holdup volume and removes fluids at a rate of 18 ml./hr. under 25 lb./sq. inch vacuum (12 ml./hr. at 10 lb./sq. inch). The unit is about 12 x 12 x 3 cm. in dimension. Other units may have a concentration path of 1280 cm. long, 0.6 cm. wide and 0.05 cm. deep with a 40 ml. hold-up volume and having dimensions of 17 x 17 x 5 cm. will have a fluid withdrawal rate of 360 ml./hr. under 25 lb./sq. inch vacuum. Of course, it goes without saying that these dimensions are not of a critical nature and depending upon end result desired, it is possible to utilize larger and smaller fluid pathways. More membrane exposure area or less exposure area may be utilized, the amount of exposure area being dictated entirely by the grid screen size and the dimensions of the extending portions of the grid. Additionally, the vacuum chamber size will be dictated by the amount of fluids passing therein and therethrough.

For reasons of ease of fabrication and for other reasons such as cleanliness, transparency, etc. the end sections have been shown as being fabricated of a plastic material such as "Lucite" but it is, of course, possible to utilize Plexiglas, Teflon, vinyl or any other type material. It need not be plastic and may be of another material such as metal, opaque in nature. The only criteria necessary being of sufficient strength to withstand the pressures involved and of a material inert to the biological and treating fluids. The plates may be formed in any suitable manner as by cutting, molding or otherwise but as indicated earlier, they have been, for experimental purposes, of the various plate and other components configuration.

The fluid pathway along which the biological fluid specimen is passed has for the most part been described and depicted as being a sheet membrane. It is, of course, possible to form a fluid pathway of either straight or serpentine configuration by the membrane material itself or similar type material such as silicone rubber tubing, etc. It is preferred, however, to utilize the membrane in sheet form and any one of a plurality of materials such as cellulose acetate, cellophane, polyethylene and other synthetic or natural sheet materials may be utilized. I have found that satisfactory results have been obtained where the membrane thickness is between 10 and 25 microns and where the membrane pore size is from about 12 to 80 angstroms. Pore size of course being selected depending upon the materials to be separated and microconcentrated.

The membrane supports desirably will have an edge portion of any one of a number of plastics or available rubber, the only requirement being that the material be somewhat deformable and compressible to engage the end plate members of the cell or cells in fluid-tight, abutting relationship. The screen or grid portion of the supports may be of plastic, porous glass or metal mesh. Any porous material will suffice so long as fluid flow may occur therethrough and it does not flex or bend beyond the elastic limit of the membrane it is intended to support. It has been found that a stainless steel wire of 150–300 mesh, with a preferred mesh of 200, performs satisfactorily.

A number of experiments, and actual separation and microconcentration processes were conducted to prove the efficiency of the method and apparatus of the herein disclosed invention.

EXAMPLE I

Utilizing a cell similar to that depicted in FIG. 2 wherein the fluid pathway had a total volume of 1.8 ml. and the cell employed a pair of cellulose acetate membranes, (available under the trademark "Cuprophan") each membrane having a thickness of 12.5 microns, a pore size of 15 A. and being about 20.43 cm. x 20.43 cm. in size, under a vacuum of 15–25 p.s.i.g., serum protein was separated and microconcentrated. To 200 ml. saline solution was added 1 cc. of blood to provide a dilute protein solution. 30 ml. of this dilute solution having 0.037 gm. protein/100 cc. was introduced into the cell. At first single drops were individually collected and stored in separate test tubes from the cell's outlet. Subsequently, additional drops were recovered in separate capillary tubes. To the first collected single drop was added 0.5 ml. of distilled water for purposes of analysis. The ultraviolet wave band absorption was determined with a DU spectrophotometer and protein concentration calculated as 8.6 gms. percent. Thusly, a dilute protein solution having 0.037 gm. percent protein was concentrated to one having a high degree of protein concentration.

EXAMPLE II

Using the same type of apparatus and procedure as set forth in Example I, 30 ml. of blood serum was concentrated and desalted by the passage of distilled water through the cell after the serum solution had passed through the cell. Using usual laboratory procedures, selected components of the concentrated serum and the filtrate were determined and compared to that of the original serum and the data obtained is set forth in the following Table I:

TABLE I

| Serum | Total protein, gms./100 cc. | Alkaline phosphatase, units | Acid phosphatase, units | Creatinine, mgs./100 cc. | Uric acid, mgs./100 cc. | Cl-, milli-equivalents/ liter | Na+, milli-equivalents/ liter |
|---|---|---|---|---|---|---|---|
| Original serum | 6.8 | 2.3 | 0.4 | 1.4 | 6.2 | 106 | 142 |
| Concentrated and desalted | 23.1 | 7.6 | 1.4 | | | 1 | 2 |
| Filtrate (deproteinized) | | | | 1.3 | 6.0 | 110 | 138 |

As has been indicated earlier, prior art methods of separation and concentration lack the speed of the instant invention. The time element is important so as not to permit denaturation of the protein content of a biological fluid. A series of tests were conducted and content of various fluids determined by electrophoresis to ascertain whether or not denaturation had occurred using the method and apparatus of this invention. The averaged results of these tests are tabulated in Table II following:

TABLE II

| Serum | Runs[1] | Albumin, percent | Globulin, percent | | | |
|---|---|---|---|---|---|---|
| | | | Alpha 1 | Alpha 2 | Beta | Gamma |
| Undiluted | 3 | 52.8 | 5.0 | 12.6 | 11.0 | 18.6 |
| Diluted with physiological saline NaCl (.85 gm. percent) solution and then concentrated | 3 | 53.1 | 4.7 | 14.1 | 9.8 | 18.3 |
| Diluted with native urine and then concentrated | 5 | 54.2 | 4.9 | 13.2 | 9.9 | 17.8 |

[1] Data is average of runs indicated.

From the foregoing it is obvious that protein denaturation did not occur using the instant invention, differences in percent results being contributable solely to experimental error.

Because of the small amount of cerebrospinal fluid normally available, as opposed to other biological fluids, a series of separating and microconcentration tests were conducted using such fluid samples and the end products analyzed by electrophoresis to determine the components thereof.

Following Table III accurately depicts the results:

TABLE III

| Number of runs | Total protein, mg./ml. | Pre-albumin, percent | Albumin, percent | Globulin, percent | | | |
|---|---|---|---|---|---|---|---|
| | | | | Alpha 1 | Alpha 2 | Beta | Gamma |
| 5 | 36.1 | 3.9 | 62.0 | 5.2 | 7.3 | 13.2 | 8.6 |

From the foregoing examples and tables, it is clear that a unique method and apparatus has been disclosed which permits the separation and microconcentration of particular substances from dilute solutions in which they are found and which procedures have heretofore been impossible to perform without incurring deleterious effects.

The embodiments of this invention in which an exclusive property or privilege is claimed are defined as follows:

1. The method of dialyzing substances of macromolecular structure contained in a mixture comprising said substance, salts and a carrier substance of different molecular structure comprising the steps of:
(a) passing said mixture along a fluid pathway formed by porous membrane characterized as permitting fluid passage therethrough but substantially inhibiting the passage of said substances of macromolecular structure,
(b) maintaining a pressure differential adjacent said fluid pathway and allowing withdrawal of said carrier substance from said fluid pathway,
(c) allowing said substances of macromolecular structure including salts to be entrained within said fluid pathway,
(d) flowing a solvent for said salts along said fluid pathway containing said macromolecular structure substances and said salts while maintaining said pressure differential and
(e) recovering substantially salt-free macromolecular substances from said fluid pathway.

2. The method in accordance with claim 1 wherein said fluid pathway is formed by a pair of spaced, semipermeable membranes.

3. The method in accordance with claim 2 wherein said macromolecular structure substances are proteins, said solvent is water and said fluid pathway is serpentine in configuration.

4. The method of separating and microconcentrating substances of macromolecular structure from a mixture comprising said substances and a carrier substance of different molecular structure comprising the steps of:
(a) passing said mixture along a fluid pathway defined by a semi-permeable membrane and an oppositely facing surface, said membrane being characterized as permitting fluid passage therethrough but substantially inhibiting the passage of said substances of macromolecular structure,
(b) confining said membrane at a plurality of spaced locations to define a flow pathway of serpentine configuration between oppositely facing areas of said membrane and said surface between said locations,
(c) maintaining a pressure differential between said fluid pathway and the exterior thereof and allowing withdrawal of said carrier substance from said fluid pathway, and (d) recovering said substances of macromolecular structure from the end of said fluid pathway in concentrated form.

5. The method of claim 4 wherein said surface is defined by a second semi-permeable membrane and both membranes are confined at said location to define said path.

6. The method in accordance with claim 5 wherein said serpentine fluid pathway has an inlet of larger volume than said outlet.

7. The method in accordance with claim 5 wherein said mixture is introduced into the inlet of said serpentine path.

8. The method in accordance with claim 5 wherein said mixture is initially passed through a preconcentrating step consisting of passing said mixture through a fluid pathway of non-serpentine configuration and then passing said preliminarily concentrated mixture into the inlet of said serpentine path.

9. The method in accordance with claim 5 wherein said pressure differential is obtained by subjecting the ambient space adjacent said fluid pathway to a vacuum.

10. The method in accordance with claim 5 wherein said semi-permeable material is selected from the group consisting of silicone rubber, cellophane, cellulose acetate, polyethylene and mixtures thereof.

11. The method in accordance with claim 5 wherein said semi-permeable material has a pore size of about 12 to 80 angstroms and a thickness of about 10 to 25 microns.

12. The method in accordance with claim 5 wherein said mitxure is selected from biological fluid specimens selected from the group consisting of cerebrospinal, urine and blood and said macromolecular structure substances include proteins.

13. Apparatus for the treatment of biological fluids, comprising cell structure formed by a pair of oppositely facing semi-permeable sheet membranes defining a fluid path having an inlet and an outlet, first and second membrane supports on opposite sides of said membranes, first and second plates on opposite sides of said membrane supports, the inside faces of each of said first and second plates being grooved to define fluid chambers, said first and second membrane supports having laterally extending spaced segments of nonporous material to thereby confine said membranes at spaced locations while defining a serpentine fluid flow path between said membranes at areas between said locations, said chambers being in registering relation with the areas between said locations, means for connecting said chambers to a source of vacuum to thereby provide a pressure differential between said chambers and said areas between said membranes, means for connnecting an outlet from said path to a specimen collector, and means defining an inlet to said path.

14. Apparatus as set forth in claim 13 wherein said first and second membrane supports have screen, grid-like structures between said segments.

15. Apparatus in accordance with claim 13 wherein said fluid path has a smaller volume at the terminal end thereof than through the remainder of said path whereby concentrated biological specimens may be recovered at the terminal end of said path.

16. Apparatus in accordance with claim 15 wherein a conduit is disposed between said semi-permeable sheets communicating with the initial larger portion of said serpentine path in fluid-tight relationship thereby forming said inlet and a similar conduit communicates with the smaller volume terminal portion of said serpentine path to thereby form a specimen outlet.

17. The apparatus as set forth in claim 13 wherein a series of cells are stacked in tandem relationship with the outlet of a preceding cell communicating with the inlet of the successive cell, at least one of said cells having membrane sheets and support structure as recited in claim 13.

References Cited
UNITED STATES PATENTS

| | | | |
|---|---|---|---|
| 2,864,506 | 12/1958 | Hiskey | 210—22X |
| 3,085,687 | 4/1963 | Erbach | 210—321X |
| 3,398,091 | 8/1968 | Greatorex | 210—23 |
| 3,456,805 | 7/1969 | Jarvis et al. | 210—321 |
| 3,483,867 | 12/1969 | Markovitz | 210—23X |

FRANK A. SPEAR, JR., Primary Examiner

U.S. Cl. X.R.
210—321, 433, 456